United States Patent [19]

Strobl

[11] Patent Number: 4,746,829
[45] Date of Patent: May 24, 1988

[54] BRUSH GEAR ASSEMBLY

[75] Inventor: Georg Strobl, Repulse Bay, Hong Kong

[73] Assignee: Johnson Electric Industry Manufactory, Limited, Chai Wan, Hong Kong

[21] Appl. No.: 890,826

[22] Filed: Jul. 30, 1986

[51] Int. Cl.$^4$ ............................................. H02K 13/00
[52] U.S. Cl. ..................................... 310/239; 310/241; 310/242; 310/244; 310/248
[58] Field of Search .................... 310/40 MM, 89, 239, 310/261, 240, 230, 241, 242, 244, 245, 246, 247, 248, 249, 251, 252

[56] References Cited

U.S. PATENT DOCUMENTS

| | | | |
|---|---|---|---|
| 4,195,242 | 3/1980 | Mabuchi | 310/239 |
| 4,254,353 | 3/1981 | Matsuda | 310/239 |
| 4,368,398 | 1/1983 | Mabuchi | 310/248 |
| 4,431,933 | 2/1984 | Mabuchi | 310/239 |
| 4,494,029 | 1/1985 | Hoshino | 310/239 |
| 4,574,215 | 3/1986 | Mabuchi | 310/239 |

FOREIGN PATENT DOCUMENTS

| | | | |
|---|---|---|---|
| 2458991 | 7/1975 | Fed. Rep. of Germany | 310/239 |
| 0071253 | 5/1982 | Japan | 310/239 |
| 1021997 | 3/1966 | United Kingdom | 310/239 |
| 1062700 | 3/1967 | United Kingdom | 310/239 |
| 1108080 | 4/1968 | United Kingdom | 310/239 |
| 2023942 | 1/1980 | United Kingdom | 310/239 |

Primary Examiner—R. Skudy
Attorney, Agent, or Firm—Fleit, Jacobson, Cohn & Price

[57] ABSTRACT

An improved brush gear assembly for use in a miniature motor. The brush gear assembly is mounted within the interior of the end cap of the motor and basically consists of three parts: a terminal element or fitting, a brush leaf element, and a brush. The terminal element consists of a generally planar brass part, a major part of which is defined as an elongated rectangular portion. One end of the rectangular portion defines a bending end. Near the bending end are disposed three staggered projections arranged generally in line adjacent to a transverse bending line formed on the rectangular portion. The leaf spring is formed from a substantially elongated planar copper strip, which has one end terminating in a bending portion. The remainder of the strip constitutes a spring portion and terminates at its other end in a brush receiving portion, which is reinforced by bending the sides in an upward direction. In a preferred embodiment, the planar part of the distal end of the brush portion is bent at an approximately 20 degree angle relative to the planar part of the proximal end of the brush portion. The bending portion of the brush leaf contains a transverse bending line spaced a predetermined distance from the end of the leaf spring. Defined within the area between the end and the bending line are three apertures offset relative to each other in order to ensure proper orientation of the brush leaf relative to the terminal when the apertures are mated with projections. By a conventional technique, such as by a punch and anvil, the projections are dimpled and their peripheral edges are caused to expand to secure the brush leaf to the terminal. The brush leaf is then bent in the direction of the terminal so that an angle of approximately 71 degrees is provided between the planar surface of the terminal and the planar spring portion of the brush leaf. After this has been accomplished, the terminal portion is bent along the bending line so that an angle of approximately 69 degrees is provided between the bending portion of the planar portion of the terminal. Because the terminal portion has a lesser angle than the brush leaf, the brush leaf will be maintained in intimate contact with the bending portion of the terminal.

10 Claims, 4 Drawing Sheets

U.S. Patent  May 24, 1988  Sheet 1 of 4  4,746,829
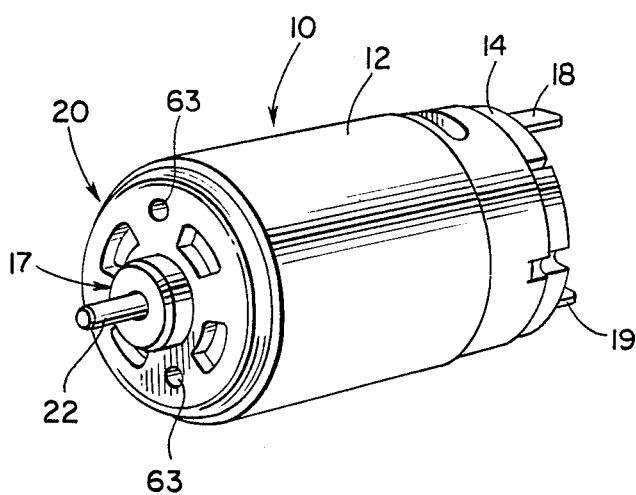
FIG. 1
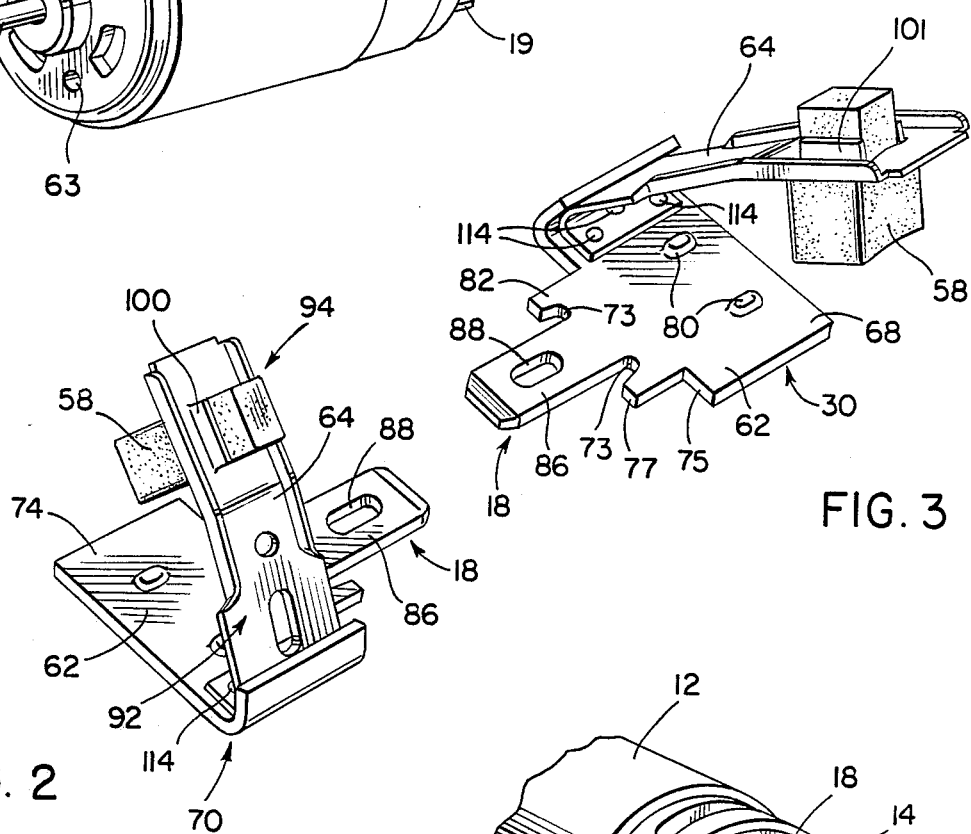
FIG. 2
FIG. 3
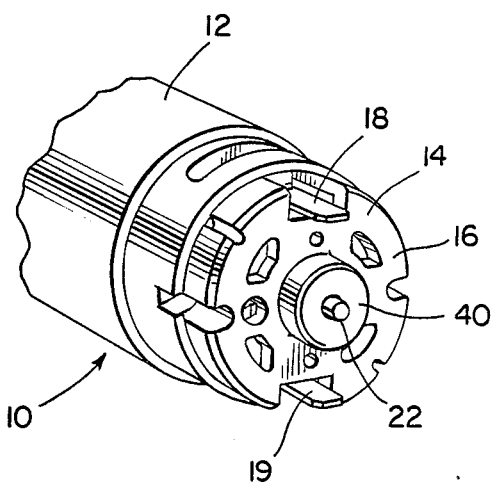
FIG. 4
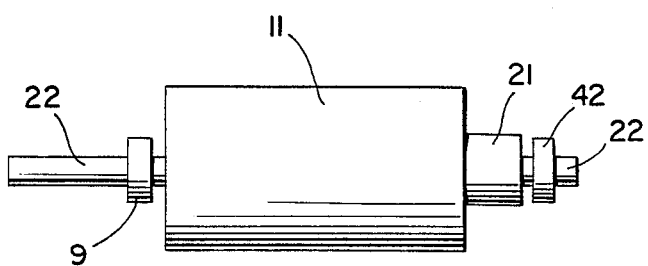
FIG. 20

BRUSH GEAR ASSEMBLY

FIELD OF THE INVENTION

The present invention is related to brush gear assemblies for use in motors generally and to a brush gear assembly for use in a miniature motor in particular.

BACKGROUND OF THE INVENTION

In small motors which employ a rotor coil or armature having a plurality of commutator segments, current is passed through the rotor coil through the use of brushes that receive current from a remote source such as a battery. The current to the coil is periodically reversed by the action of the commutator, thus maintaining the same direction of motor force within the motor. The brushes, which are typically made of carbon, are supported in a brush leaf in order to have the surface of the brush continuously make contact with the commutator segments during operation of the motor.

As the size of a motor decreases, it becomes more difficult to design and construct a brush leaf with the appropriate geometry so that the brush leaf will support a brush against the commutator segments with the correct pressure throughout the wear cycle of the brush. Further, it is also difficult to design a brush leaf assembly which provides a brush of sufficient length to meet the requirements of the life cycle of the motor.

There have been a number of designs for providing a brush leaf assembly in a motor having a housing diameter on the order of 34 millimeters. One of the more common solutions has been to design a brush leaf which acts as a cantilever spring to create a force for holding a brush mounted at the distal end of the spring in contact with the commutator. In order to ensure that the brush is in proper contact with the commutator, the cantilever spring should be of maximum length within the space available within the motor housing. In order to accomplish this, the prior art assemblies employ an angled leaf dividing the brush leaf into two sections formed on either side of the angle formed in the leaf. The second section of the leaf is used to connect the leaf to a terminal which in turn is connected to a source of current such as a battery.

FIGS. 18 and 19 show a prior art construction of a brush leaf for use in a small motor. In particular, FIG. 19 shows the use of a reinforced elbow 120 in order to try to eliminate the spring effect of the angle formed between the spring portion and the terminal portion of the copper strip. The complexity of the prior art system is also illustrated by the provision of a terminal portion 122 that is formed at an angle with a planar portion 124 which is also at an angle relative to the brush spring. As shown in FIG. 16, when the brush leaf is positioned within the motor, a plastic support 126 is provided within the motor housing to further reinforce the elbow 120 of the prior art brush leaf. At the same time, additional structure is needed to provide the terminals at the exterior of the motor. In particular, the terminal consists of a flat terminal portion 130 with a planar portion formed at an angle thereto, as can be seen in FIG. 17. The planar portion 132 contains an aperture which is positioned to mate with the aperture defined in the terminal 122. A securing grommet 136 is provided to secure the terminal 130 to the terminal portion 122 and the end cap of the motor.

Because of the angle between the section of the leaf used as a cantilever and the section used to connect to a terminal, the brush leaf becomes a compound spring in which the resilience of the angle makes some contribution to the force pressing the brush to the commutator. This extra resilience causes the brush leaf to behave unpredictably and, therefore, it is desirable to remove this extra resilience as a component of the spring force being exerted on the brush. One attempt to remove the unpredictable behavior has been to reinforce the elbow joint where the angle is formed in the brush leaf by providing a dimple to stiffen the joint so that it makes less of a contribution to the operation of the spring. Another solution has been to surround the elbow with a reinforcing plastic integral with the end cap of the motor into which the leaf and terminal are fitted. Although these prior art solutions have met with some success, there is nevertheless a need for an improved brush assembly which ensures that the brush pressure against the commutator segments on an armature is maintained constant throughout the life of the brush. The present invention is directed toward filling that need.

SUMMARY OF THE INVENTION

The present invention relates to an improved brush gear assembly for use in a miniature motor. In a preferred embodiment, the motor includes a housing and an end cap. The inventive brush leaf assembly is mounted within the interior of the end cap. The brush assembly basically consists of three parts: a terminal element or fitting, a brush leaf element, and a brush. The terminal element consists of a generally planar brass part. A major part of the terminal element is defined as an elongated rectangular portion. One end of the rectangular portion defines a bending end. Near the bending end of the rectangular portion are disposed three staggered projections which are arranged generally in line adjacent to a transverse bending line formed on the rectangular portion. Also disposed on the top surface of the rectangular portion are a pair of projections used to guide and secure the terminal within each of the slots of the end cap assembly. A terminal section emanates sideways from the rectangular portion of the terminal.

In a preferred embodiment, the leaf spring is formed from a substantially elongated planar copper strip. The strip has one end terminating in a bending portion. The remainder of the strip constitutes a spring portion and terminates at its other end in a brush receiving portion. The spring portion occupies less of the length of the strip than does the brush receiving portion when measured along the longitudinal axis of the strip. The brush portion is reinforced by bending the sides in an upward direction. In a preferred embodiment, the planar part of the distal end of the brush portion is bent at an approximately 20 degree angle relative to the planar part of the proximal end of the brush portion. When a brush is inserted into a brush receiving opening, two tabs on the strip act against the sides of the brush in order to prevent movement of the brush outside of the opening.

The bending portion of the brush leaf contains a transverse bending line spaced a predetermined distance from the end of the leaf spring. Defined within the area between the end and the bending line are three apertures. The apertures are offset relative to each other in order to ensure proper orientation of the brush leaf relative to the terminal when the apertures are mated with the projections.

By a conventional technique, such as by a punch and anvil, the projections are dimpled and their peripheral edges are caused to expand. In this way, the brush leaf is secured to the terminal. The brush leaf is then bent in the direction of the terminal so that an angle of approximately 71 degrees is provided between the planar surface of the terminal and the planar spring portion of the brush leaf. After this has been accomplished, the terminal portion is bent along the bending line so that an angle of approximately 69 degrees is provided between the bending portion and the planar portion of the terminal. Because the terminal portion has a lesser angle than the brush leaf, the brush leaf will be maintained in intimate contact with the bending portion of the terminal.

In this arrangement, the brush leaf is in a position relative to the terminal in which it would be after the brush had been worn to its lowest point. When the brush leaf contains an unworn brush, the brush leaf bends around the cantilever spring portion. By this arrangement, a brush leaf assembly is provided which is able to exert a fairly constant brush force against the commutator during the life of the motor and the brush.

It is thus an object of the present invention to provide a brush leaf assembly which ensures that the brush pressure is maintained substantially constant against the commutator throughout the life of the brush.

It is another object of the present invention to provide an improved motor containing a brush leaf assembly that ensures substantially constant brush pressure against the commutator of the motor throughout the life of the motor.

It is yet an object of the present invention to optimize the configuration of a motor brush holder for use in a small bodied motor.

These and other objects will become apparent when viewed in connection with the following description taken in conjunction with the following drawings in which:

BRIEF DESCRIPTION OF THE DRAWINGS

FIG. 1 is a perspective view of the outside of a motor incorporating the teachings of the present invention.

FIG. 2 is a rear perspective view of a brush gear assembly incorporating the teachings of the present invention.

FIG. 3 is a front perspective view of the brush gear assembly of FIG. 2.

FIG. 4 is a rear perspective view partially cut away of the motor of FIG. 1.

FIG. 20 is a schematic diagram showing the major elements of a motor including the shaft, bearings, armature and commutator.

DETAILED DESCRIPTION OF THE PREFERRED EMBODIMENT

Figure 5:
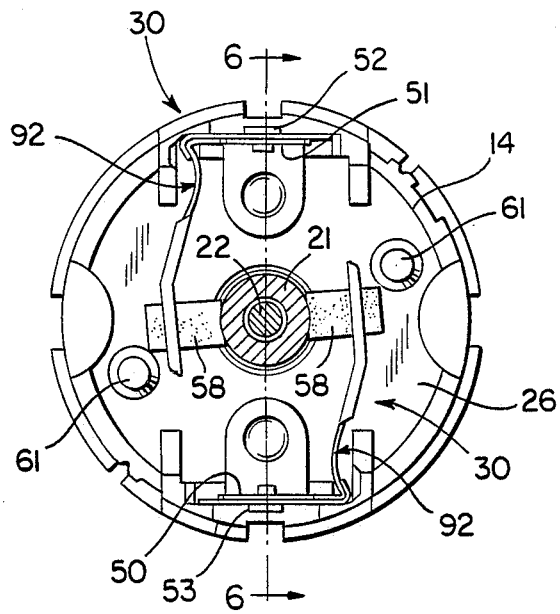
FIG. 5 is a view looking into the end cap of the motor of FIG. 1.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIGS. 1 and 4 generally show in perspective the outline of a small direct current motor 10. The outside of the motor basically consists of a housing 12 and an end cap 14. The end of the end cap terminates in an exterior surface 16 from which a pair of terminals 18 and 19 emerged. These terminals are connected to a source of current such as a direct current battery in order to supply current to the motor. The motor also terminates in a forward portion 20 that is characterized by the presence of a rotating shaft 22 which is intended to provide the driving force to a utilization device. The shaft 22 is formed as an integral part of the rotor or armature 11 contained within the motor housing. Each end of the shaft 22 is mounted within bearings 9 and 42 as illustrated in FIG. 20. Bearings 9 and 42 are disposed in the front of the housing at 17 and in the end cap at 40, respectively.

Figure 6:
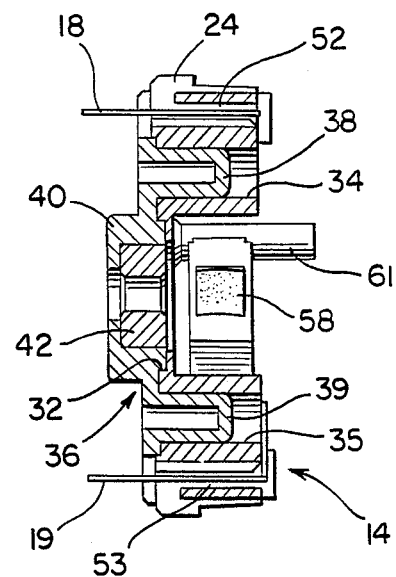
FIG. 6 is a view taken along lines 6—6 of FIG. 5 with the shaft and commutator removed.

FIGS. 5 and 6 show the details of the interior of the end cap 14 with the inventive brush leaf assemblies 30 mounted therein. The end cap is generally of two piece molded construction and consists of a major cap portion 24 that defines an open volume 26 within which are mounted a pair of brush leaf assemblies 30. The major body portion of the end cap is generally cylindrically shaped and has a concentric aperture 32 bounded on either side by a pair of smaller apertures 34 and 35 arranged in-line along a diameter passing through the center of aperture 32. An end cap insert 36 is placed in a mating relationship with the major body portion. The insert has a pair of close-ended tubular projections 38 and 39 which are positioned to be received by openings 34 and 35 in the main body portion. Insert 36 also contains a centrally located projection 40 which has an interior volume for receiving a bearing 42. One end of the shaft 22 of the rotor is received within the bearing 42 and emanates outside of the projection 40 a small distance. In line with the apertures 34 and 35 near the periphery of the end cap are opposed slots 50 and 51 within which are mounted the brush leaf assemblies 30. Further slots 52 and 53 are provided through which the terminal portions 18 and 19, respectively, of the two brush assemblies 30 emerge.

The end cap also includes a pair of inwardly extending tubular extensions which mate with opposed extensions 63 defined in the motor housing. A suitable fastening means, such as a bolt, is introduced in extension 61, passes through the motor housing and is secured to a nut positioned within extension 63.

When the armature 11 is mounted within the motor, the commutator 21 which is positioned next to the armature on the shaft 22 is placed into contact with the ends of the brushes 58 found on each of the brush leaf assemblies. By applying a direct current initially to the terminals 18 and 19, and then through the brushes to the various commutator segments, the shaft of the motor rotates in a constant direction.

Figure 13:
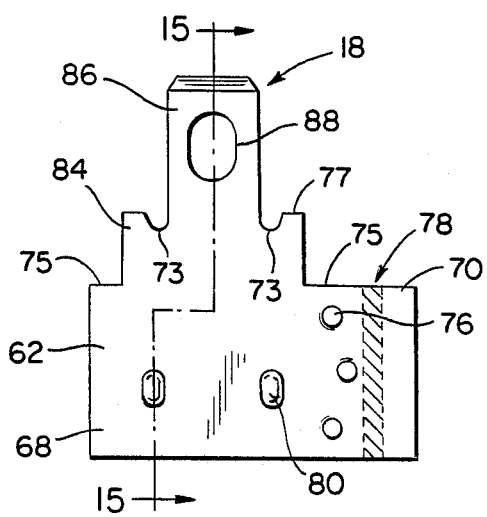
FIG. 13 is a top plan view of the terminal element of the brush gear assembly of FIG. 2 prior to bending.
Figure 14:
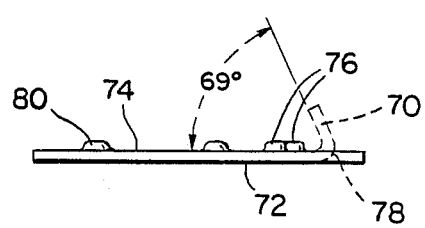
FIG. 14 is a rear plan view of the terminal element of FIG. 13.
Figure 15:
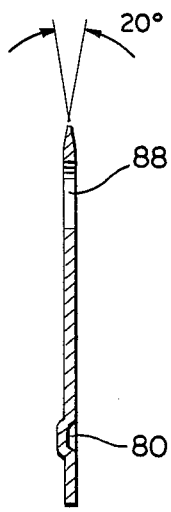
FIG. 15 is a view taken along lines 15—15 of FIG. 13.
Figure 16:
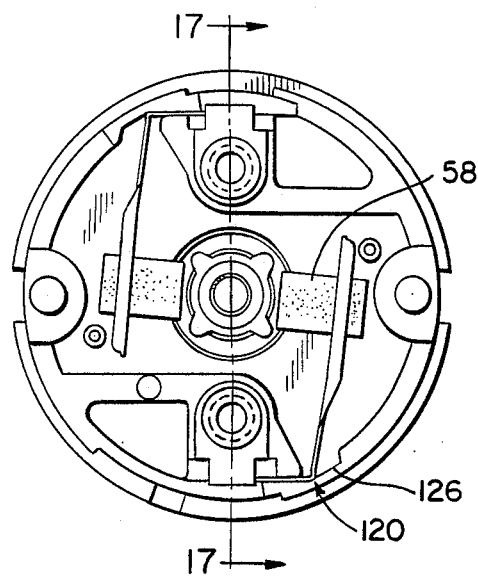
FIG. 16 is a view similar to that of FIG. 5 showing a prior art brush gear assembly.
Figure 17:
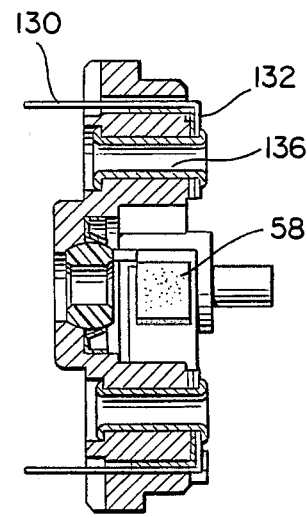
FIG. 17 is a view taken along lines 17—17 of FIG. 16.
Figure 18:
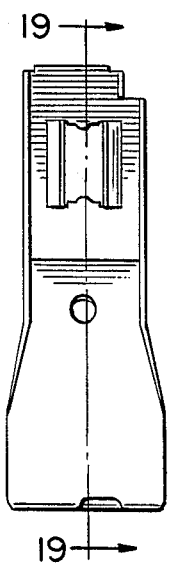
FIG. 18 is a rear view of a prior art brush gear assembly with the brush removed.
Figure 19:
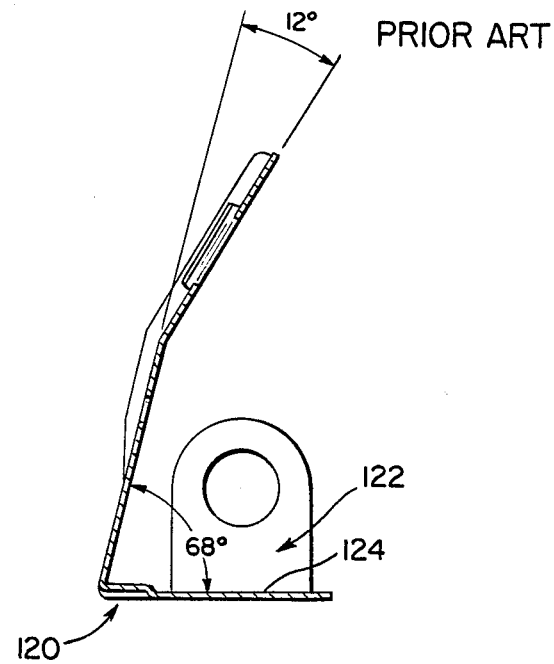
FIG. 19 is view taken along lines 19—19 of FIG. 18.

FIGS. 2, 3 and 7 through 15 generally show one of the inventive brush assemblies 30. The brush assembly basically consists of three parts: a terminal element or fitting 62, a brush leaf element 64, and a brush 58. FIGS. 13 through 15 show the substantially planar terminal element prior to assembly to the leaf. The terminal element consists of a generally planar brass part. A major part of the terminal is defined as an elongated rectangular portion 68. One end of the rectangular portion defines a bending end 70. The rectangular portion has a bottom planar surface 72 and a top planar surface 74. Near the bending end of the rectangular portion are disposed three projections 76 which are staggered generally in line adjacent to a transverse bending line 78 formed on the rectangular portion. Also disposed on the top surface of the rectangular portion are a pair of projections 80. Both projections 80 and 76 are formed by being half punched. Projections 76 are used to secure the brush leaf to the terminal prior to bending of both the leaf and the terminal. Projections 80 are used to guide and secure the terminal within each of the slots 50 and 51 of the end cap assembly. A terminal section 82 emanates sideways from the rectangular portion 68 of the terminal. The terminal section, which occupies the same plane as the rectangular portion, basically comprises a small rectangular portion 84 having one of its sides merging with one of the sides 75 of rectangular portion 68. A narrow planar terminal 86 emanates from the other side 77 of the rectangular portion 84 of the substantially planar terminal element. On either side of the place where the terminal 86 merges with side 77, the rectangular portion contains a circular cut-out 73. An aperture 88 is provided in the terminal 86 for receiving a wire which in turn is connected to the terminal of a battery (not shown).

Figure 8:
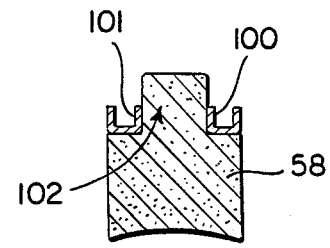
FIG. 8 is a view taken along lines 8—8 of FIG. 7.
Figure 9:
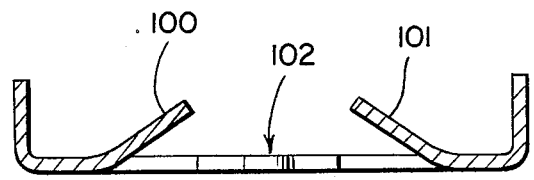
FIG. 9 is a view used to illustrate the tabs found in the brush holding portion of the brush gear assembly.
Figure 10:
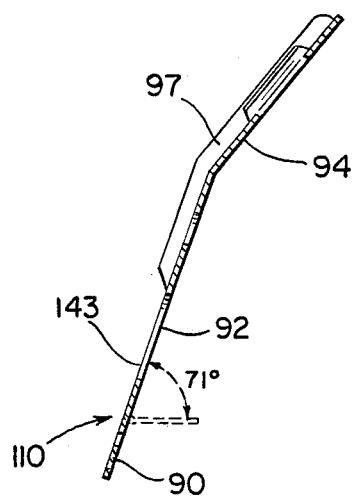
FIG. 10 is a side view of the brush leaf forming part of the brush gear assembly of FIG. 2.
Figure 11:
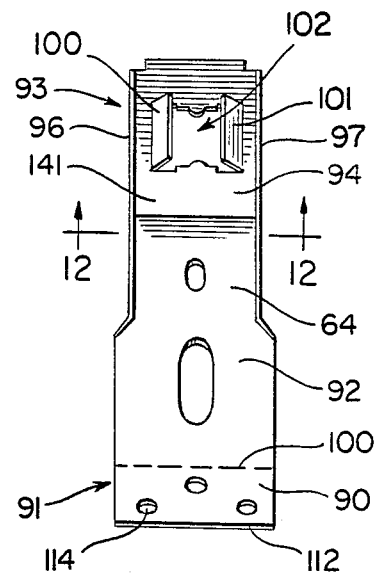
FIG. 11 is a plan view of the brush leaf of FIG. 10.
Figure 12:
FIG. 12 is a view taken along lines 12—12 of FIG. 11.

FIGS. 10 through 12 show the leaf spring 64 prior to assembly to the terminal fitting 62. In a preferred embodiment, the leaf spring is made from 0.13 millimeter thick beryllium copper strip to ASTM standard B194, alloy 165. The leaf spring is formed from a substantially elongated planar copper strip. The strip has a rearward end 91 terminating in a bending portion 90. The remainder of the strip is divided into a spring portion 92 and terminates at its other end 93 in a brush receiving portion 94. The spring portion occupies less of the length of the strip than does the brush receiving portion. The brush portion 94 is reinforced by bending the sides 96 and 97 in an upward direction when viewed in FIG. 12. The surface 141 of the distal end of the brush portion is bent at an approximately 20 degree angle relative to the planar surface 143 of the proximal end of the brush portion. This angle may be varied to suit the material used to construct the brush leaf. As shown in FIGS. 9 and 11, the brush receiving portion of the brush leaf has a pair of upwardly directed tabs 100 and 101 defined as part of the brush receiving opening 102. As shown in FIG. 8, when a brush 58 is inserted into the brush receiving opening 102, the tabs 100 and 101 act against the sides of the brush in order to prevent movement of the brush outside of the opening 102.

The bending portion 90 of the brush leaf contains a transverse bending line 110 spaced a predetermined distance from the end 112 of the leaf spring. Defined within the area between the end 112 and the bending line 110 are three apertures 114. These apertures are spaced so that they mate with projection 76 provided on the top surface 74 of the terminal. The apertures are offset relative to each other in order to ensure proper orientation of the brush leaf relative to the terminal when the apertures 114 are mated with the projections 76.

Figure 7:
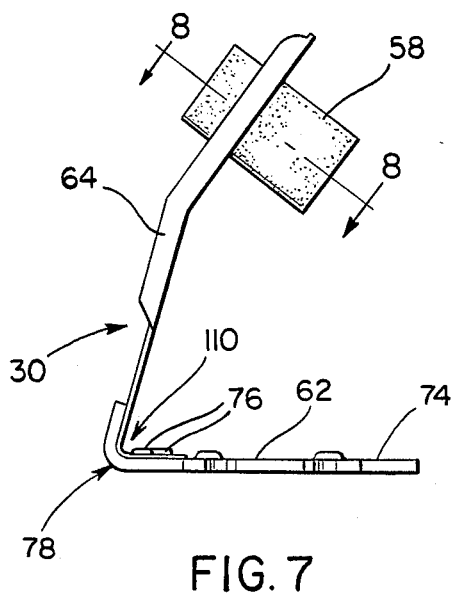
FIG. 7 is a side plan view of the brush gear assembly of FIG. 2.

With reference to FIGS. 2, 3 and 7, the brush leaf, before bending, is placed on the top surface 74 of the unbent terminal so that the apertures 114 of the brush leaf receive the projection 76 from the terminal. The brush leaf extends outwardly from the terminal and the bend line 110 generally coincides with the bend line 78 of the terminal. By a conventional technique, such as by a punch and anvil, the projections 76 are dimpled and their peripheral edges are caused to expand. In this way, the brush leaf is secured to the terminal. The brush leaf is then bent upwardly and in the direction of the terminal so that an angle of approximately 71 degrees is provided between the planar surface of the terminal and the planar spring portion 92 of the brush leaf. After this has been accomplished, the terminal portion is bent along the bending line 78 so that an angle of approximately 69 degrees is provided between the bending portion 70 and the planar portion 68 of the terminal. Because the terminal portion has a lesser angle than the brush leaf, the brush leaf will be maintained in intimate contact with the bending portion 70 of the terminal.

In the arrangement shown in FIGS. 2 and 3, the brush leaf is in a position relative to the terminal in which it would be after the brush had been worn to its lowest point with the brush leaf spring relaxed. As shown in FIG. 5, when the brush leaf contains an unworn brush, the brush leaf bends around the cantilever spring portion 92 and forms a fulcrum. As can be seen by the curving of the cantilever spring, all of the spring tension takes place within that area and none of the spring tension takes place at the elbow where the brush leaf is in contact with the terminal. By this arrangement, a brush leaf assembly is provided which is able to exert a fairly constant brush force against the commutator during the life of the motor and the brush. In a preferred embodiment, the brush pressure on the commutator is approximately 130 gm throughout the life of the brush.

From the above, it is apparent that many modifications and variations of the present invention are possible in light of the above teachings. It is therefore to be understood that, within the scope of the appended claims, the invention may be practiced otherwise than as specifically described.

What is claimed is:

1. A brush leaf assembly for use in a motor, said brush leaf assembly comprising:
   a substantially planar elongated flat leaf spring terminating at one end in a brush-receiving portion, and at the other end in a terminal -mating portion;
   a substantially planar terminal element terminating at one end in a terminal adapted to receive a connection to a power source, and at the other end in a brush leaf-mating portion;
   means for securing said terminal-mating portion to said brush leaf-mating portion;
   a brush;

means defined in said substantially planar elongated flat leaf spring for holding said brush;

one end of said brush leaf-mating portion being bent to define a first planar arm, said first planar arm being bent to a first predetermined angle relative to an elongated rectangular portion of said substantially planar terminal element;

one end of said terminal-mating portion being bent to define a second planar arm, said second planar arm being bent to a second predetermined angle relative to a planar spring portion of said substantially planar elongated flat leaf spring;

said substantially planar terminal element and said substantially planar elongated flat leaf spring being positioned relative to each other so that said second planar arm contacts said elongated rectangular portion of said substantially planar terminal element and said first planar arm contacts said planar spring portion; and wherein said second predetermined angle is less than 90°, said first predetermined angle being less than said second predetermined angle for pressing said first planar arm against said planar spring portion to cause intimate contact between said planar spring portion and said first planar arm at an edge of said first planar arm, said edge of said first planar arm forming a fulcrum for said planar spring portion.

2. The brush assembly of claim 1, further comprising means for reenforcing said brush-receiving portion.

3. The brush assembly of claim 2, wherein said reenforcing means comprises a portion of said spring having been bent at an angle relative to said substantially planar elongated flat leaf spring.

4. The brush assembly of claim 1, wherein said second predetermined angle is approximately 71 degrees and said first predetermined angle is approximately 69 degrees.

5. A motor including a brush assembly, said motor comprising:
   a motor housing, said housing being open at one end;
   a rotor rotatably mounted in said housing;
   a commutator mounted on said rotor, said commutator including a plurality of commutator segments;
   an end cap mounted at said one end of said housing for closing off said housing, said end cap being hollow inside for receiving a brush leaf assembly that holds a brush in operative contact with commutator segments of said commutator;
   said brush leaf assembly including
   a substantially planar elongated flat leaf spring terminating at one end in a brush-receiving portion, and at the other end in a terminal-mating portion;
   a substantially planar terminal element terminating at one end in a terminal adapted to receive a connection to a power source, and at the other end in a brush leaf-mating portion;
   means for securing said terminal-mating portion to said brush leaf-mating portion;
   one end of said brush leaf-mating portion being bent to define a first planar arm, said first planar arm being bent to a first predetermined angle relative to an elongated rectangular portion of said substantially planar terminal element;
   one end of said terminal-mating portion being bent to define a second planar arm, said second planar arm being bent to a second predetermined angle relative to a planar spring portion of said substantially planar elongated flat leaf spring;
   said substantially planar terminal element and said substantially planar elongated flat leaf spring being positioned relative to each other so that said second planar arm contacts said elongated rectangular portion of said substantially planar terminal element and said first planar arm contacts said planar spring portion; and wherein said second predetermined angle is less than 90°,
   said first predetermined angle being less than said second predetermined angle for pressing said first planar arm against said planar spring portion to cause intimate contact between said planar spring portion and said first planar arm at an edge of said first planar arm, said edge of said first planar arm forming a fulcrum for said planar spring portion.

6. The motor of claim 5, further comprising:
   a brush; and
   means defined in said substantially planar elongated flat leaf spring for holding said brush.

7. The brush assembly of claim 5, further comprising means for reenforcing said brush-receiving portion.

8. The brush assembly of claim 7, wherein said reenforcing means comprises a portion of said spring having been bent at an angle relative to said substantially flat planar elongated leaf spring.

9. The brush assembly of claim 5, wherein said second predetermined angle is approximately 71 degrees and said first predetermined angle is approximately 69 degrees.

10. A brush leaf assembly for use in a motor, said brush leaf assembly comprising:
    a substantially planar elongated flat leaf spring terminating at one end in a brush-receiving portion, and at the other end in a terminal-mating portion;
    a substantially planar terminal element terminating at one end in a terminal adapted to receive a connection to a power source, and at the other end in a brush leaf-mating portion;
    means for securing said terminal-mating portion to said brush leaf-mating portion;
    a brush;
    means defined in said substantially planar elongated flat leaf spring for holding said brush;
    one end of said brush leaf-mating portion being bent to define a first planar arm, said first planar arm being bent to a first predetermined angle relative to an elongated rectangular portion of said substantially planar terminal element;
    one end of said terminal-mating portion being bent to define a second planar arm, said second planar arm being bent to a second predetermined angle relative to a planar spring portion of said substantially planar elongated flat leaf spring;
    said substantially planar terminal element and said substantially planar elongated flat leaf spring being positioned relative to each other so that said second planar arm contacts said elongated rectangular portion of said substantially planar terminal element and said first planar arm contacts said planar spring portion; and
    said first predetermined angle being less than said second predetermined angle for pressing said first planar arm against said planar spring portion, and wherein said second predetermined angle is approximately 71 degrees and said first predetermined angle is approximately 69 degrees.

* * * * *